United States Patent
Willey

(10) Patent No.: US 8,660,588 B2
(45) Date of Patent: Feb. 25, 2014

(54) METHOD AND APPARATUS FOR FORMING A PAGE MESSAGE IN A RADIO COMMUNICATION SYSTEM

(75) Inventor: William Daniel Willey, Gilroy, CA (US)

(73) Assignee: BlackBerry Limited, Waterloo (CA)

( * ) Notice: Subject to any disclaimer, the term of this patent is extended or adjusted under 35 U.S.C. 154(b) by 1262 days.

(21) Appl. No.: 11/855,371

(22) Filed: Sep. 14, 2007

(65) Prior Publication Data

US 2008/0070595 A1   Mar. 20, 2008

Related U.S. Application Data

(60) Provisional application No. 60/825,808, filed on Sep. 15, 2006.

(51) Int. Cl.
*H04W 68/00* (2009.01)
(52) U.S. Cl.
USPC ............................ 455/458; 455/515; 370/349
(58) Field of Classification Search
USPC ................................... 455/515, 458; 370/349
See application file for complete search history.

(56) References Cited

U.S. PATENT DOCUMENTS

| | | | |
|---|---|---|---|
| 6,249,681 B1 * | 6/2001 | Virtanen | 455/466 |
| 6,674,739 B1 * | 1/2004 | Lee et al. | 370/342 |
| 6,832,094 B2 * | 12/2004 | Butler et al. | 455/458 |
| 2003/0013485 A1 * | 1/2003 | Jung | 455/557 |
| 2005/0165949 A1 * | 7/2005 | Teague | 709/236 |
| 2006/0084432 A1 * | 4/2006 | Balasubramanian et al. | 455/434 |
| 2006/0176870 A1 * | 8/2006 | Joshi et al. | 370/345 |
| 2006/0234676 A1 * | 10/2006 | Harris et al. | 455/410 |
| 2007/0076682 A1 * | 4/2007 | Kim et al. | 370/349 |
| 2007/0099645 A1 * | 5/2007 | Kim | 455/522 |

* cited by examiner

*Primary Examiner* — Kashif Siddiqui

(57) ABSTRACT

Apparatus and an associated method is provided for facilitating paging of an access terminal in a radio communication system. A page message with partial identities is generated that includes an access sequence ID. The access sequence ID is used by the access terminal when responding to a page. The access terminal sends an access probe using the access sequence ID included in the page. The page message includes a message structure with partial identities where the access sequence ID is conditionally included. If the access terminal is to use a regular pool of access sequence IDs, the access terminal is not sent an access sequence ID in the page.

13 Claims, 7 Drawing Sheets

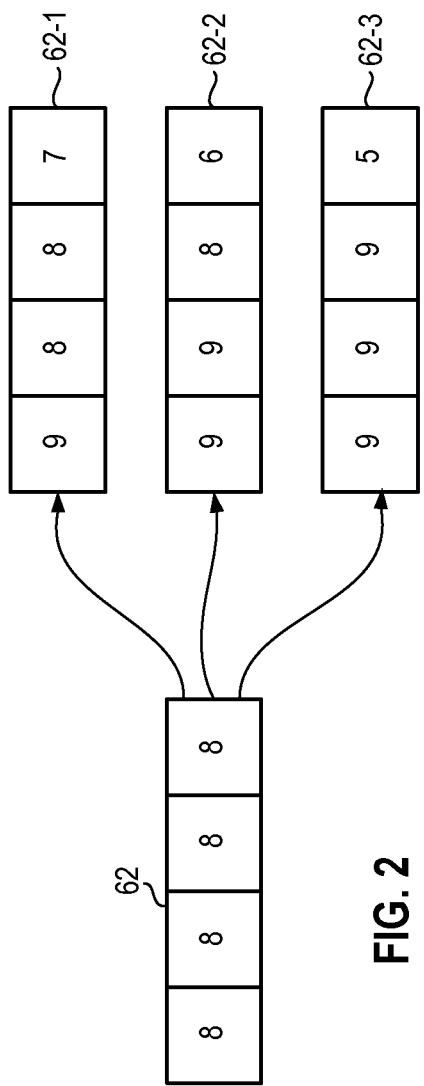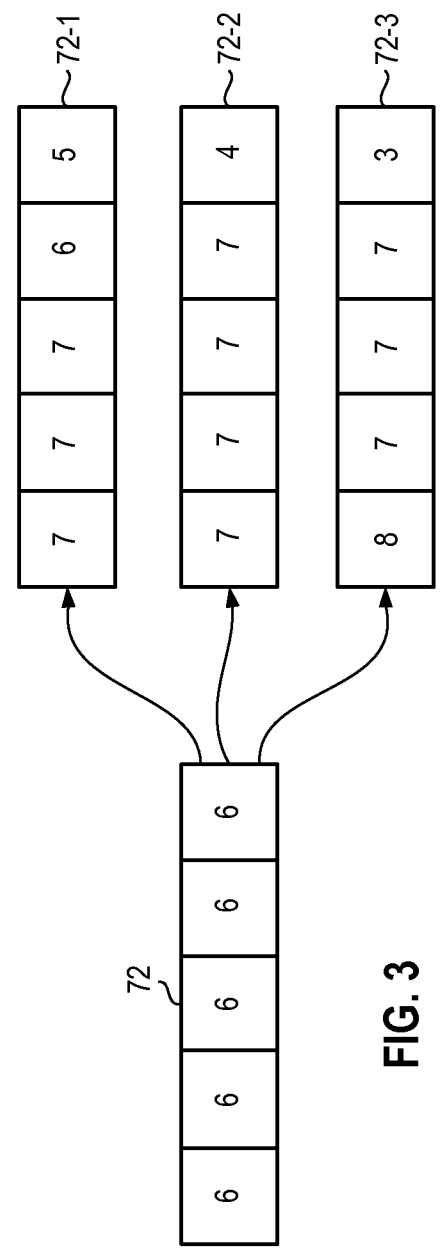

| LENGTH | MESSAGE ID | NUMBER OF PAGES | AS INCL. | PAGE ATI 1 | AS 1 | PAGE ATI 2 | AS 2 | PAGE ATI 3 | AS 3 | PAGE ATI 4 | AS 4 | PAGE ATI 5 | AS 5 | PAGE ATI 6 | AS 6 | SPARE |

FIG. 8

| LENGTH | MESSAGE ID | NUMBER OF PAGES | AS INCL. | PAGE ATI 1 | PAGE ATI 2 | PAGE ATI 3 | PAGE ATI 4 | PAGE ATI 5 | PAGE ATI 6 | PAGE ATI 7 | SPARE |

FIG. 9

| LENGTH | MESSAGE ID | NUMBER OF PAGES | AS INCL | P.I.1 | P.I.2 | P.I.3 | P.I.4 | P.I.5 | P.I.6 | P.I.7 | P.I.8 | P.I.9 | P.I.10 | P.I.11 | SPARE |

FIG. 10

METHOD AND APPARATUS FOR FORMING A PAGE MESSAGE IN A RADIO COMMUNICATION SYSTEM

CROSS REFERENCE TO RELATED APPLICATIONS

The present invention claims the priority of provisional patent application No. 60/825,808, filed on Sep. 15, 2006, the contents of which are incorporated herein by reference.

The present invention relates generally to a manner by which to page an access terminal of a radio communication system to alert the access terminal of a pending call, or other communication. More particularly, the present invention relates to an apparatus, and an associated method, by which to form a quick page message that includes a structure, formed of partial identities of access terminals that are paged. The bit length of one or more of the partial identities is shortened, and one or more others have a bit length that is lengthened in an attempt to create partial identities that are of redundant values. When two or more identities are of the same values, duplicate partial identities are removable from the page message, permitting the bits of the removed, partial identities to be allocated to, e.g., increase lengths of partial identities remaining in the structure of the page message.

When quick paging is performed through broadcast of a page message, for a given number of pages included in the page message, the structure of the page message includes partial identities of lengths best to minimize occurrence of false wakeup of an access terminal. Excessive battery depletion as a result of false wakeup of the access terminal is avoided.

BACKGROUND OF THE INVENTION

Advancements in communication technologies have permitted the development and deployment of new types of communication systems and communication services. Cellular telephony, and associated communication services available therethrough, are popularly utilized by many, typically providing users with communication mobility and also provides the capability of communications when the use of wireline communication systems would not be practical or possible.

While early-generation, cellular communication systems provided primarily for voice communications and only limited data communication services, newer-generation systems increasingly provide for high-speed data communication services at variable data communication rates. A CDMA2000, cellular communication system that provides for EV-DO services is an exemplary type of new-generation, cellular communication system that provides for high-speed data services. Operational details and protocols defining communications and operational requirements of devices of the system are set forth in an operating standard specification. Various aspects of operation of the CDMA2000 EV-DO communication scheme remain to be standardized and certain parts of the existing standard specification are considered for amendment. Various successor-generation communication schemes are also undergoing standardization and yet others are envisioned to be standardized.

For instance, a revision to the standard specification, release B of the CDMA2000 EV-DO specification standard defines a quick paging channel (QPCH) available upon which to broadcast access-terminal pages by an access network (AN) to an access terminal (AT). The QPCH was adopted in industry contributions 3GPP2 C20-20060323-013R1 and 3GPP2 C20-20060323-003R1 and published in 3GPP2 document C.S0024-B V1.0. Generally, pages are broadcast by the access network to an access terminal to alert the access terminal of a pending communication. And by so alerting the access terminal, the access terminal performs actions to permit the effectuation of the communication. Page indications broadcast upon the quick paging channel are broadcast in a manner that facilitates reduced battery consumption of the access terminal by reducing the battery consumption of the battery of the access terminal. Increased battery longevity is provided, reducing the rate at which a battery of the access terminal must be recharged. The access terminal is, as a result, able to be operated for a greater period of time between rechargings or battery replacement. The aforementioned promulgations provide for broadcast of a message including page indications upon a physical logical layer that is monitored by the access terminal. The access terminal monitors the QPCH prior to monitoring the control channel to receive regular, control channel MAC (medium access control) messages such as page messages. A quick page message is broadcast upon the QPCH.

In one configuration, the quick page message contains quick page indicators. The quick page message includes a number of quick page indicator slots populated with the quick page indicators that indicate whether an access terminal is being paged. An exemplary configuration of a scheme that utilizes page indications is set forth, for instance, in industry contribution 3GPP2 C20-20060731-033. In this configuration, during operation, a mobile station hashes to a quick page indicator location, i.e., slot, within the quick page message based upon a session seed, i.e., a 32-bit pseudorandom number. If the quick page indicator of the quick page indicator slot to which the access terminal hashes indicates that the access terminal is not being paged, the access terminal enters into a sleep state, a reduced-power state, in which the access terminal does not remain powered at a level to receive the regular control channel MAC messages. Power savings is particularly significant in the event that the control channel MAC messages are lengthy and span multiple control channel frames or capsules.

In another configuration, a partial hash comparison scheme is provided. In the disclosed partial hash comparison scheme, the access network forms a quick page message in which a portion of an access terminal identifier (ATI) of an access terminal that is paged is placed in the quick page message. An access terminal that monitors for the delivery of a quick page message, reads the content of the message and compares the values with corresponding values, that is, portions of a hash of the identifier of that access terminal. If the values do not match, then the access terminal enters into a reduced power state, e.g., a sleep state. Contribution C20-20060731-033 shows that partial hashes can also be used in a partial comparison method to improve battery life; a partial hash of an ATI will be more random than an ATI. Contribution C21-20060906-003 and also C21-20060906-004 propose that an AN page an AT on the Quick Paging Channel and regular paging channel, respectively, using a pseudorandom variable called a SessionSeed. Contribution C20-20060731-033 had proposed paging with a hash of an ATI. Partial comparison using a pseudorandom variable will be more random than a hash of an ATI, particularly using the hash function in the 3GPP2 specification C.S0024-B v1.0. Partial comparison using the SessionSeed also provides more random bits than the current hash function in C.S0024-B v1.0. Additionally, U.S. Pat. No. 6,072,987 introduces the idea of partial address comparison to improve battery life. Partial address comparison is performed, starting with the LSBs of an address to overcome the problem of an address not being random in all bits.

The QPCH message, as presently-proposed, provides thirty-five page indication locations, i.e., bits available to be populated with paging indicators. The aforementioned "partial hash comparison" scheme utilizes three of the thirty-five page indication locations for identifying the number of pages, and the remaining page indication locations are available for paging, viz., are available. While the proposed, partial hash comparison scheme reduces the false wakeup probability when paging load is relatively low, as the paging load increases, the reduction in the available page indication locations actually increases the possibility of false wakeup. When more than five access terminals are paged, partial hash comparison is not used due to this increased possibility. Instead, hashing to page indication locations is performed. Additionally, 3GPP2 contribution C22-20060825-008 proposes that an AN assign a paging ATI to the AT. But this contribution fails to propose an ATI assignment algorithm for the Access Network.

If a manner could be provided by which to improve the performance of a scheme that utilizes partial comparison pursuant to paging by better reducing the possibility of false wakeup, improved battery longevity of the access terminal would be possible.

It has further been suggested that paging using a Session-Seed is not ideal for the reason that the SessionSeed would be used for too many activities, viz. the variable would be overloaded. If a further manner could be provided that does not require use of the SessionSeed, this problem would be avoided.

An enhanced mobile terminated connection setup procedure has further been proposed that includes an access sequence ID in the page for each AT. Access procedures for the proposed LBC standard can be found in section 1.3.3 of the 3GPP2 contribution C30-20060731-040R4. According to the proposed LBC standard, the access sequence ID identifies a 1024 Walsh Sequence used in modulating access probes of an access attempt. The enhanced mobile terminated connection setup procedure avoids collisions on page responses by reserving an access sequence ID for the AT being paged and sending it in the page, whereas traditional mobile terminated procedures such as in contribution C21-20060911-031 allow for collisions on the access channel (i.e. two ATs could attempt to transmit using the same access sequence at the same time) and resolve the collisions when they occur. According to traditional procedures, when an AT performs an access attempt in response to a page, the AT generates a random access sequence. The enhanced mobile terminated connection setup procedure requires that the identities of ATs (paging ATIs, for example) in the paging message be unique since collisions are not allowed. Because collisions can occur when paging using partial identity comparison, the enhanced mobile terminated connection setup procedure does not work when paging using partial identity comparison. Furthermore, it should be noted that the enhanced mobile terminated connection setup procedure adds extra bits to each page message (6 proposed) which reduces paging capacity which is counter to the goal of paging using partial identity comparison.

If a further manner could be provided by which to combine the enhanced mobile terminated connection setup procedure with paging using partial identity comparison, improved operation would result.

It is in light of this background information related to paging by an access network of an access terminal that the significant improvements of the present invention have evolved.

BRIEF DESCRIPTION OF THE DRAWINGS

FIG. 2 illustrates a representation of exemplary structures that are formable pursuant to operation of an embodiment of the present invention.

FIG. 3 illustrates a representation, similar to that shown in FIG. 2, but of a representation of other exemplary structures formable pursuant to additional operation of an embodiment of the present invention.

FIG. 8 illustrates a representation of an exemplary page message provided when an enhanced mobile terminated connection setup procedure is used.

FIG. 9 illustrates a representation of an exemplary page message provided when an enhanced mobile terminated connection setup procedure is not used.

FIG. 10 illustrates a representation, similar to that shown in FIG. 9, but of another page message used when the enhanced mobile terminated connection setup procedure is not used.

DETAILED DESCRIPTION

Figure 1:
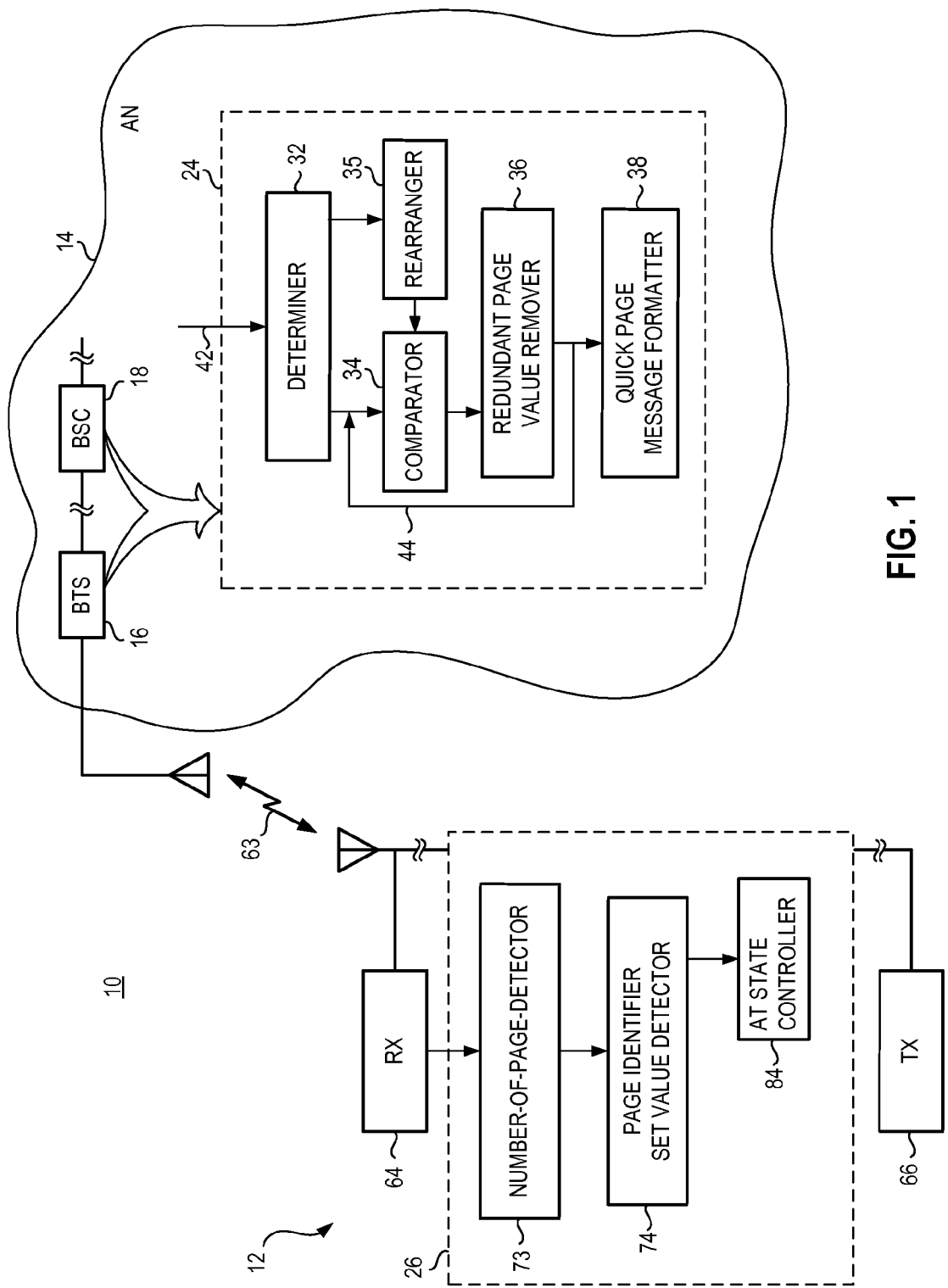
FIG. 1 illustrates a functional block diagram of a radio communication system in which an embodiment of the present invention is operable.

The present invention, accordingly, advantageously provides an apparatus, and an associated method, by which to page an access terminal of a radio communication system to alert the access terminal of a pending call, or other communication.

Through operation of an embodiment of the present invention, a manner is provided by which to form a quick page message that includes a structure formed of partial identities of access terminals that are paged. The partial identities are each of selected lengths, selected in manners that act to facilitate reduction in the possibility of false wakeup of an access terminal that monitors delivery of the quick page message.

In one aspect of the present invention, the bit length of one or more of the partial identities is shortened and one or more of the others of the partial identities is lengthened. The selection of the bit-length shortening and bit-length lengthening is made better to cause creation of partial identities of identical values, thereby to become redundant. By decreasing the bit length of a partial identity, the likelihood of its identity with another partial identity of the same length is increased. And, when redundant partial identities are formed, the redundancy is removed, permitting the bits of the redundant, partial identity to be allocated to lengthen other partial identities. Such increase facilitates reduction in the likelihood of a false wakeup at an access terminal that receives the quick page message.

In another aspect of the present invention, a partial identity scheme is utilized in the quick paging procedure. The partial identity comparison utilizes parts of the identifiers, such as access terminal identifiers (ATIs), pseudorandom or random numbers, or any other numbers amenable for association with access terminals that are paged. The portion of the identifier that is included in the quick page message comprises, for instance, a selected number of the most significant bits, or least significant bits, of the number. The length of each of the partial identifiers is selected and is dependent upon various factors.

The length of the quick page message is prescribed. For instance, the quick page message is of a thirty-five bit length of which thirty-two bits are available to be populated with a structure including a selected number of partial identifiers. The other three bits, e.g., identify the number of pages contained in the quick page message. In general, when the number of pages increases, the number of bits available in the quick page message available to identify a particular access terminal decreases due to the prescribed length of the quick page message. That is to say, for example, if thirty-two bits are available in the quick page message, and only one access terminal is paged, all thirty-two bits are allocable to identify the access terminal that is paged. However, if two access terminals are to be paged, the same thirty-two bits must be divided so that both of the access terminals can be paged. Analogously, when three access terminals are paged, the available thirty-two bits of the quick page message must be divided to permit all three of the access terminals to be paged, and so forth when there are greater numbers of access terminals that are paged.

In a conventional proposal, the available bits of the quick page message are divided equally to provide to each of the access terminals that are paged an equal number of bits in the quick page message when a partial comparison scheme is used. However, depending upon the number of pages, the thirty-two available bits cannot be divided equally. To maintain the equal distribution of the allocated bits, one or more of the thirty-two bits is unused.

Operation of an embodiment of the present invention both makes better utilization of all the available bits of the quick page message available to page access terminals and to select a structure including selection of lengths of partial identifiers of the access terminals that are to be paged. Selection of the bit lengths of the partial identifiers is made to increase the possibility of occurrence of redundant partial identifiers that permit the redundancies to be removed out of the quick page message and the bit locations of the removed, redundant values are then usable to increase the bit lengths of the partial identifiers of the remaining, e.g., non-redundant, partial identifiers.

By reducing the bit-length of a partial identifier, the possibility of the shortened, partial identifier being identical with another partial identifier of the same length increases. By creating such a redundancy, a redundant partial identifier is removable out of the quick page message, and the structure of the quick page message is changed to reallocate the newly-available bits to lengthen the partial identifiers of one or more other partial identifiers of the structure. Different numbers of partial bits are used dependent upon the number of partial bits of the partial identifiers of different access terminals match.

In these and other aspects, therefore, an apparatus, and an associated method, is provided for an access network of a communication network that generates a first page message on a first paging channel. A determiner is configured to determine page values of each page identifier set of each page intended to be included in the first page message. A rearranger is configured to rearrange a length of at least one of the page identifier sets of pages intended to be included in the first page message. Rearrangement is made in a manner that facilitates reduction in a probability parameter.

In these and further aspects, a further apparatus, and an associated method, is provided for an access terminal that monitors a first paging channel for delivery of a first paging message. A number-of-pages detector is configured to detect how many page identifier sets are included in the first page message. A page identifier set value detector is configured to detect values of each page identifier set detected by the number-of-pages detector to be included in the first page message. Lengths of the page identifier sets are arranged in a manner facilitating reduction of a probability parameter.

Referring first, therefore, to FIG. 1, a radio communication system, shown generally at 10, provides for communications with access terminals, of which the access terminal 12 is exemplary. The communication system forms a multi-user communication system that typically includes a large number of access terminals and a plurality of concurrent communication dialogs. While only a single access terminal is shown in FIG. 1, additional access terminals, analogous to the access terminal 12, typically form a portion of the communication system.

Communications are effectuated between an access terminal and a radio network 14, formed of fixed network infrastructure elements, such as a base transceiver station (BTS) 16 and a base station controller (BSC) 18. The access network encompasses a geographical area within which communications with the access network are possible. That is to say, when an access terminal is positioned within the area encompassed by the access network, the access terminal is generally able to communicate with the access network, and the access network is typically able to communicate with the access terminal.

The communication system is operable in general conformity with the operating protocols and parameters of an appropriate communication specification standard. The description set forth herein is exemplary, and the teachings of various embodiments of the present invention are implementable in any of various types of communication systems.

As previously mentioned, access terminals are alerted, by broadcast of a page message when a communication, initiated at the network, is to be terminated at an access terminal. A quick paging channel (QPCH), or analogous channel, is defined. Information contained in a quick page message broadcast on the quick paging channel identifies access terminals that are paged. When an access terminal detects, from the quick page message, that the access terminal is paged, the access terminal further operates in anticipation of the page and subsequent communication. The access terminal, conversely, enters into a reduced-power consumption state, e.g., a sleep state, if the access terminal does not detect that it is being paged. If the access terminal incorrectly determines that it is being paged, the access terminal falsely wakes up. And, increased levels of power are consumed by the access terminal, resulting in reduced battery longevity. The aforementioned partial hash comparison scheme is intended to reduce the likelihood of false wakeup of the access terminal, but, as presently implemented, provides advantages only when a quick page message pages five or fewer access terminals. Additionally, not all of the bits of a quick page message are fully utilized in every paging scenario, and the existing scheme, for this reason, is less than ideal.

Accordingly, pursuant to an embodiment of the present invention, the access network includes apparatus 24, and the access terminal includes apparatus 26, that operate pursuant to quick page message generation and quick page message receipt in manners that reduce the likelihood of occurrence of false wakeup relative to an existing partial hash comparison scheme. The elements of the apparatus 24 and of the apparatus 26 are functionally represented, implementable in any desired manner, including, for instance, by algorithms executable by processing circuitry.

The elements forming the apparatus 24 are implemented at any appropriate location of the access network, including, as illustrated, at the BTS 16 or BSC 18, or distributed amongst such entities, as well as others.

Here, the apparatus 24 includes a determiner 32, a comparator 34, a rearranger 35, a redundant page value remover 36, and a quick page message formatter 38.

The determiner 32 operates to determine, based upon information provided thereto, here represented by way of the lines 42, information associated with a quick page message that is to be created for broadcast to access terminals. The information provided to the determiner includes, for instance, identifiers that identify the access terminals that are to be paged. The identifiers comprise multi-bit numbers, for instance, forming the access terminal identifiers (ATIs) of the access terminals, pseudorandom numbers, or random numbers, or any other values amenable for identification of an associated access terminal. The determiner, for instance, determines, based upon the number of pages intended to be included in the quick page message, to create partial identifiers of the respective identifiers of the access terminals. Determinations made by the determiner of the bit lengths of the partial identifiers are, for instance, conventionally-selected bit lengths. Indications of determinations made by the determiner are provided to the comparator 34 and to the rearranger 35. The comparator compares values of the partial identifiers intended to be included in the quick page message. Such comparisons indicate whether any of the partial identifiers are redundant. As a result of comparisons made by the comparator, the redundant page remover 36 removes the redundant partial identifiers. A loop back to the determiner, here represented by way of the path 44, permits reconfiguration of the partial identifiers subsequent to removal of a redundant partial identifier.

Here further, the rearranger 35 is operable. The rearranger is operable further to rearrange the bit lengths of the partial identifiers that are determined by the determiner to be includable in a quick page message intended to be broadcast.

In first exemplary operation of an embodiment of the present invention, the determinations made by the determiner 32 are first provided to the rearranger 35, and the rearranger 35 rearranges the bit lengths of one or more of the partial identifiers. A bit-length of at least one of the partial identifiers is reduced, permitting, if desired, lengthening of the bit length of one or more others of the partial identifiers. The rearrangement made by the rearranger, such as by shortening the bit length of a partial identifier increases the possibility that another partial identifier of corresponding length shall be of the same values and thereby be redundant thereto. That is to say, therefore, the rearranger 35 operates to form partial identifiers in manners to increase the possibility of formation of redundant partial identifiers. Redundant partial identifiers need not be included in a quick page message and are deletable by the redundant page remover 36. In this exemplary operation, determinations made by the determiner 32 are provided to the rearranger 35. The rearrange 35 rearranges the bit lengths of one or more partial identifiers. Once rearranged, the partial identifiers are compared by the comparator 34, and redundancies are removed by the redundant page remover 36.

In alternate operation, rearrangement is performed by the rearranger 35 subsequent to a first pass of determined values determined by the determiner 32 and compared by the comparator 34. Or, if desired, operation need not include operation of the rearranger although, generally, the advantages provided by the rearranger in increasing the likelihood of formation of redundant, partial identifiers is not then provided.

Upon completion of rearrangement, comparison, redundant page removal, and reallocation, if elected, of the available bits, indications are provided to the quick page message formatter 38. The quick page message formatter 38 formats a quick page message to include the partial identifiers that shall be included in the quick page message, subsequently to be broadcast by the access network.

Through removal of redundant, partial identifiers, better use is made of the limited bit-length of the quick page message. And, through operation of the rearranger 35, the likelihood of a redundancy of a partial identifier, permitting its removal, is increased. When such operation reduces the likelihood of false wakeup of an access terminal, such operation facilitates communication activities in the communication network.

FIG. 2 illustrates an exemplary representation of operation of rearrangement, such as that performed by the rearranger 35 shown in FIG. 1. Here, the structure, represented at 62 of a quick page message, such as that determined by the determiner 32 shown in FIG. 1, includes four partial identifiers, each of eight-bit lengths. Rearrangement performed by the rearranger creates any of various alternate structures of which structures 62-1, 62-2, and 62-3 are shown. The structure 62-1 is of bit lengths of nine-bit, eight-bit, eight-bit, and seven-bit lengths, respectively. The structure 62-2 includes partial identifiers of bit-lengths of nine bits, nine bits, eight bits, and six bits, respectively. And, the structure 62-3 is formed of partial identifiers of nine-bit, nine-bit, nine-bit, and five-bit lengths, respectively.

FIG. 3 illustrates other exemplary structures formable pursuant to operation of an embodiment of the present invention. Here, a structure initially formed includes partial identifiers of five access terminals. Initially, each of the partial identifiers is of a six-bit length. Rearrangement operations form any of various alternate structures, of which three alternate structures, designated as 72-1, 72-2, and 72-3 are shown in the figure. The structure 72-1 includes partial identifiers of seven-bit, seven-bit, seven-bit, six-bit, and five-bit lengths, respectively. The structure 72-2 is formed of partial identifiers of seven-bit, seven-bit, seven-bit, seven-bit, and four-bit lengths, respectively. And, the structure 72-3 is formed of partial identifiers of eight-bit, seven-bit, seven-bit, seven-bit, and three-bit lengths, respectively.

Referring back to FIG. 1 again, transceiver elements of the base transceiver station 16 cause broadcast of quick page messages that have been formatted by the quick page message formatter. The messages are broadcast upon a radio air interface, represented in FIG. 1 by the arrow 63. The messages are delivered to access terminals, such as the access terminal 12, within reception range of the broadcast messages. The access terminal 12 includes transceiver circuitry, here represented by a receive part 64 and a transmit part 66. The receive part 64 operates to receive signals sent thereto, such as the quick page messages broadcast by the access network. And, certain of the detected signals are provided to the apparatus 26 embodied at the access terminal. Of significance here are detections of the quick page message broadcast by the access network.

The apparatus 26 includes a number-of-pages detector 73 and a page identifier set value detector 74. The elements are functionally represented, also implementable in any desired manner, including algorithms executable by processing circuitry. The detector 73 detects an indication in the quick page message of the number of pages that are included in the received quick page message. The number of pages are indicated in, e.g., and as noted above, a three-bit segment of the quick page message. Detection of such indication is used by the page identifier set value detector in the detection of the page identifier sets, thereby to determine whether the access terminal is paged. Additional operation at the access terminal determines, in response to the number of pages detected by the page detector of the page value lengths of the page identifier set or sets contained in the quick page message. In the event that the detector detects the access terminal not to be paged, an indication is provided to an access terminal (AT) state controller 84 to cause the access terminal to be placed in a reduced-power state, e.g., a sleep mode. If a page is detected, conversely, an indication is provided to the state controller and the controller causes the state of the access terminal to permit its further operation with respect to paging and further communication.

The false wakeup probability at an access terminal is governed by the equation:

$$1-[1``\tfrac{1}{2}"^n"]$$

Wherein:

n identifies the number, i.e., bit length, of partial identifiers.

Through operation of an embodiment of the present invention, new structures are provided that, when used, reduce the likelihood of occurrence of false wakeup. FIGS. 2 and 3 illustrate various of the new structures when four and five identifiers are to be paged within a quick page message. During operation of an embodiment of the present invention, the number of bits for one of the partial identifiers is lowered in order to give a higher probability of a match of, viz., redundancy with, another partial identifier. In an example of five pages within a quick page message, there is a fifty-one percent possibility of occurrence of at least two five-bit partial identifiers being a match. Analogously, there is a twenty-eight percent probability of match of six-bit partial identifiers, a fifteen percent probability of redundancy of at least two seven-bit partial identifiers, and an eight percent probability of redundancy of at least two eight-bit partial identifiers. Structures are used if the likelihood of false wakeup for the structure is less than the likelihood of false wakeup when a hashing to individual page indication locations and use of single-bit identifiers are used.

The false wakeup probability for the structure 62-1 shown in FIG. 2 is governed by the following equation:

$$1-\left(1-\tfrac{1}{2^9}\right)\left(1-\tfrac{1}{2^8}\right)^2\left(1-\tfrac{1}{2^7}\right)$$

The false wakeup probability for the structure 62-2 shown in FIG. 2 is:

$$1-\left(1-\tfrac{1}{2^9}\right)^2\left(1-\tfrac{1}{2^8}\right)\left(1-\tfrac{1}{2^6}\right)$$

The false wakeup probability for the structure 62-3 shown in FIG. 2 is:

$$1-\left(1-\tfrac{1}{2^9}\right)^3\left(1-\tfrac{1}{2^5}\right)$$

The structure that exhibits the lowest false wakeup probability and that generates a partial identifier that can be eliminated, if any, is the structure used by the access network. The overall false wakeup probability for a number of pages is determinable by summing the products of the various false wakeup probabilities for the new structure and the percentage of page combinations that would use them together with the product of the false wakeup probability of a page indication method for the number of pages and the percentage of page combinations where matches are unable to be made.

In a further embodiment, the access terminal is permitted immediately to respond to a quick page message without receiving the regular page message, but only if doing so would result in an acceptably low false page response probability. For example, suppose that the QPCH structure described in contribution 3GPP2 document C21-20060906-004 were used. The probability of a "match" on the quick page message for the case of one page is $$\tfrac{1}{2^{29}}$$

or $1.86 \times 10^{-9}$. The probability of a "match" on the quick page message for the case of two pages is $$1-\left(1-\tfrac{1}{2^{15}}\right)\left(1-\tfrac{1}{2^{15}}\right)$$

or $6.10 \times 10^{-5}$. The probability of a "match" on the quick page message for the case of three pages is about $$1-\left(1-\tfrac{1}{2^{11}}\right)\left(1-\tfrac{1}{2^{11}}\right)\left(1-\tfrac{1}{2^{11}}\right)$$

or 0.00146. 0.00146 may not be an acceptable probability of a false page match, but $1.86 \times 10^{-9}$ and $6.10 \times 10^{-5}$ would both be acceptably low for a number of false page matches. So if the false page response probability would be reasonably low after only receiving a quick page message and performing partial identity comparison on the quick page message contents, the AT could perform a page response immediately after detecting a partial identity match in the quick page message only. In this case the AT would be allowed to perform a page response after a partial identity match for either one or two pages. For three pages or more, however, the AT would wake up for the regular page message and perform partial identity comparison on the regular page message if it detected a partial identity match in the quick page message and only perform the page response if it detected a partial identity match in the regular page message.

The number of pages that would trigger a page response using the quick page message alone would depend upon the size of the quick page message. The AN could control the threshold at which ATs are allowed to perform page responses using the quick page message only by means of a parameter sent to ATs. For example, the AN could send a value of number of pages (i.e. send the value 2 to allow page responses on a partial identity match if there are two or fewer pages in the Quick Page Message). Alternately, the AN could send a value such as a match probability (i.e. broadcast $10^{-5}$ if ATs are allowed to send page response after receiving quick pages only if the probability of a false match after receiving the quick page message is less than $10^{-5}$).

According to this further embodiment, page responses with reduced latency are enabled by allowing ATs to perform page responses after receiving the quick page message only if the probability of a false page response would be acceptably low and otherwise receiving the regular page message.

The disclosure aims to improve battery life by introducing a method for partial identity comparison with random or pseudorandom bits in page messages.

Addresses are transmitted starting with the least significant bit and continuing with more significant bits. If the address is long, it could potentially get to a less random part of the address and the technique would be less effective. Contribution C20-20067 31-033 suggests that partial hashes be used in partial comparison method. The hashes would be hashes of an address. The address that the hash is based on may not be completely random, so this may still not produce the best partial identities for partial identity comparison. If a hash is not completely random, it could result in an increase in the false wakeup probability. Furthermore, the hashing is an extra step that it would be nice to avoid. The invention solves the problem by performing partial identity comparison using a random or pseudorandom variable (such as SessionSeed) that is known to both the AN (access network) and the AT (access terminal). Most significant bits of the SessionSeed could be used as partial identities in page messages, for example.

Figure 4:
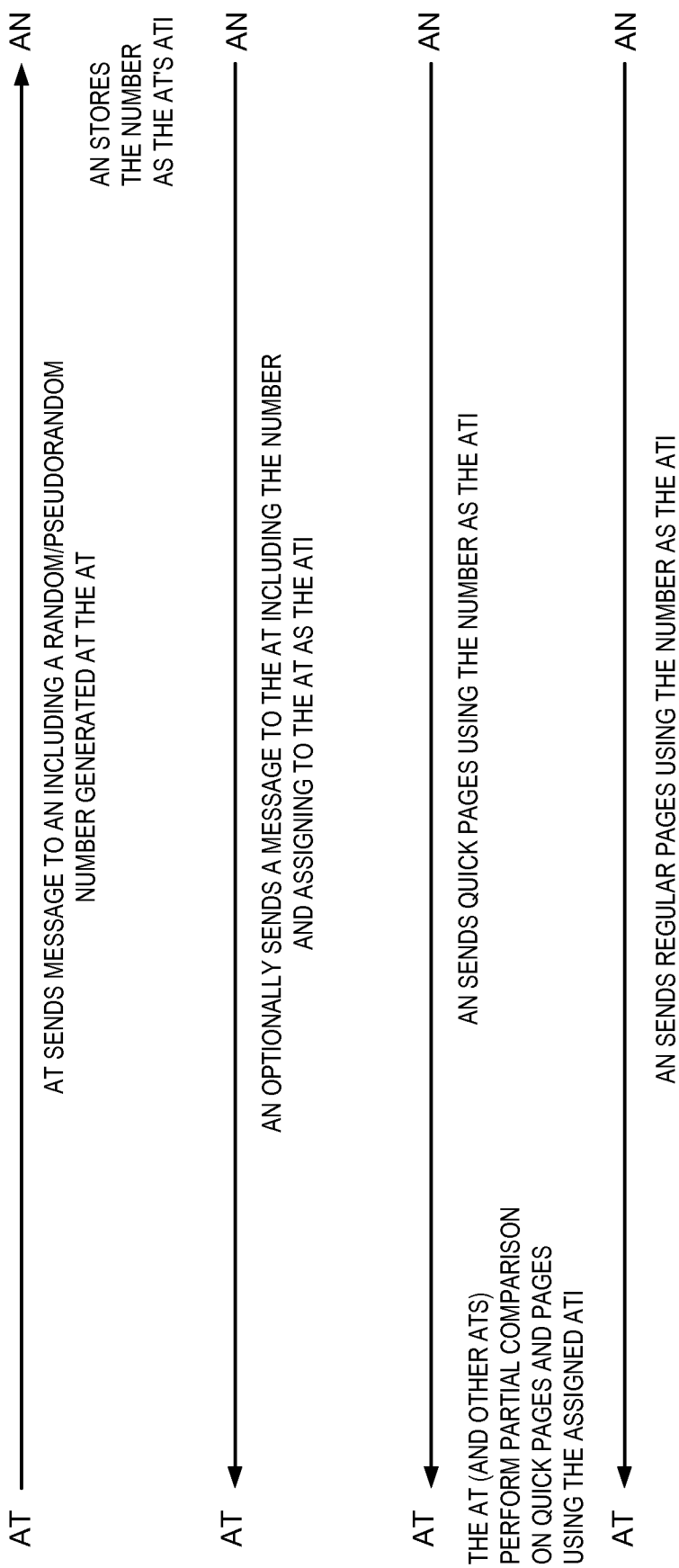
FIG. 4 illustrates a representation for random/pseudorandom ATI assignment pursuant to an embodiment of the present invention.

FIG. 4 shows a method for random/pseudorandom ATI assignment where the random/pseudorandom number is generated at the AT. First the AT generates a random or pseudorandom number. The AT then puts it in a signaling message and transmits it to the AN. One option would be to use the SessionSeed field as in the current 3GPP2 C.S0024-B v1.0 specification; alternately, another field could be used. The AN then stores the number as the AT's ATI. The AN may then optionally send a message to the AT including the number and assigning it to the AT as the ATI. The AT upon receiving this message will store the number as its ATI. The AN will then perform quick paging and paging to that AT using the ATI. The AT will then use the ATI for paging and quick paging partial comparison techniques.

Figure 5:
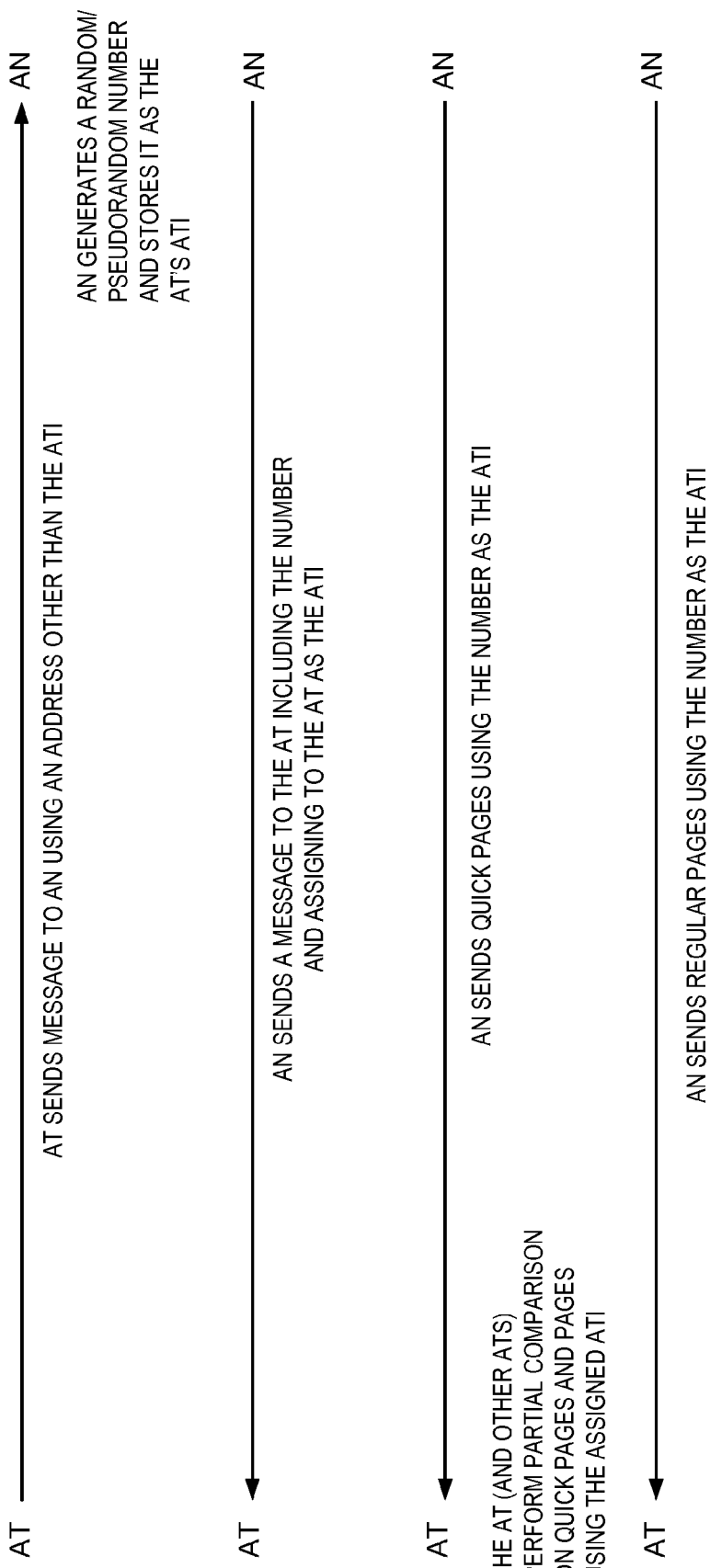
FIG. 5 illustrates another representation for random/pseudorandom ATI assignment.

FIG. 5 shows a method for random/pseudorandom ATI assignment where the random/pseudorandom number is generated in the AN. First the AT sends the AN a message using an address other than the ATI. The AN then generates a random or pseudorandom number and stores it as the AT's ATI. The AN then sends a message to the AT including the number and assigning it to the AT as the ATI. Upon receiving the message, the AT will store the pseudorandom number as the ATI. The AN will then perform quick paging and paging to that AT using the ATI. The AT will then use the ATI for paging and quick paging partial comparison techniques.

This paragraph describes a way that the proposed invention could be used in conjunction with a number of messages and procedures from the existing C.S0024-B standard. A random ATI value for UATI-based ATI record is created and used in paging. The partial bits of the random ATI are then used in partial comparison on the quick paging channel and/or the regular paging channel. The ATI that will be used for partial comparison for paging and quick paging will be set to a random or pseudorandom number. The AN could compute the number itself using a pseudorandom number generator or using some random physical input; the AN would then send the assigned paging ATI to the AT in a signaling message.

Alternately the AT could compute the number itself using a pseudorandom number generator or using some random physical input. The AT could then send this message to the AN in a signaling message. One such example is Random ATI (RATI) that AT uses in initial UATI Request message. The RATI is effectively the pseudorandom SessionSeed computed by AT and AN can set the least significant 24 bits of UATI to the least significant 24 bits of RATI sent by the AT; alternately, the AT could send another random or pseudorandom number to the AN in addition to the SessionSeed. Yet another alternative is to create a random value based on SessionSeed/RATI used by AT and UATI assigned by AN.

The AN keeps track of the hashes that will be generated by ATs whose ATI it assigned. When generating a new ATI it will assign in such a way that the hashes on the ATIs will be distributed uniformly.

The embodiments of FIGS. 4 and 5, therefore, solve the problem concerning excessive use of the SessionSeed. Instead, the ATI is assigned to be a random or pseudorandom number and performing quick paging and paging with the random ATI and using the random ATI for partial comparison. The least significant and most significant bits of the ATI can then be used for partial comparison.

Figure 6:
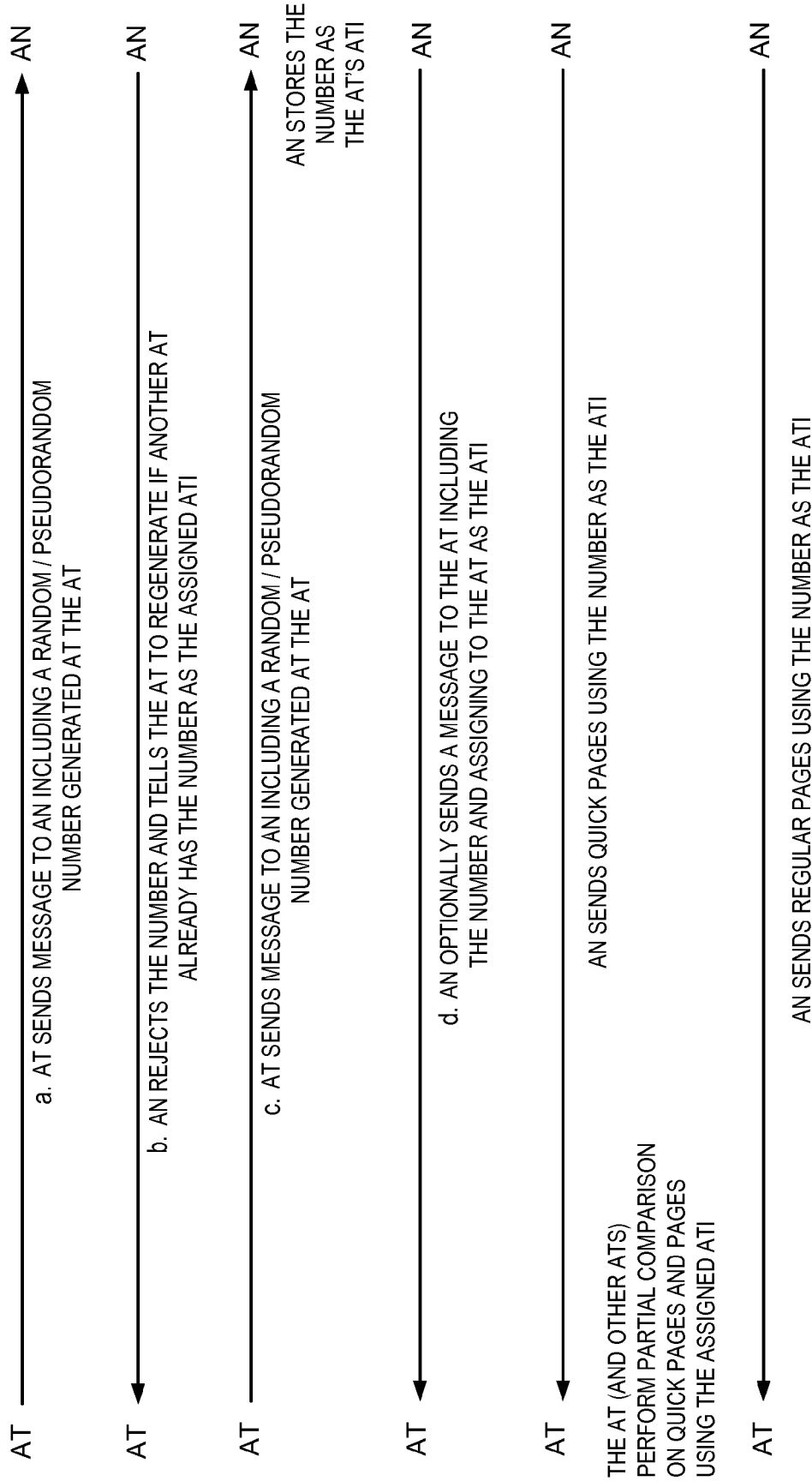
FIG. 6 illustrates another representation for random/pseudorandom ATI assignment pursuant to another embodiment of the present invention.

FIG. 6 shows a method for random/pseudorandom ATI assignment where the random/pseudorandom number is generated at the AT. First the AT generates a random or pseudorandom number. The AT then puts it in a signaling message and transmits it to the AN (step a). One option would be to use the SessionSeed field as in the current 3GPP2 C.S0024-B v1.0 specification; alternately, another field could be used. The AN then checks to see if another AT has already been assigned the received random/pseudorandom number. If another AT has already been assigned that number as its ATI, then the AN will send a reject message to the AT (step b); otherwise, the AT skips to step d where it stores the number as the AT's ATI and optionally sends a message to the AT including the number and assigning it to the AT as the ATI. Upon receiving the reject message (step b), the AT will generate a new random or pseudorandom number and puts it in a signaling message and transmits it to the AN (step c). Although not shown, the AN would again check to see if the number is assigned to another AT and steps b and c would be repeated until a unique ATI is generated. The AT upon receiving the optional message at step d will store the number as its ATI. The AN will then perform quick paging and paging to that AT using the ATI. The AT will then use the ATI for paging and quick paging partial comparison techniques.

Figure 7:
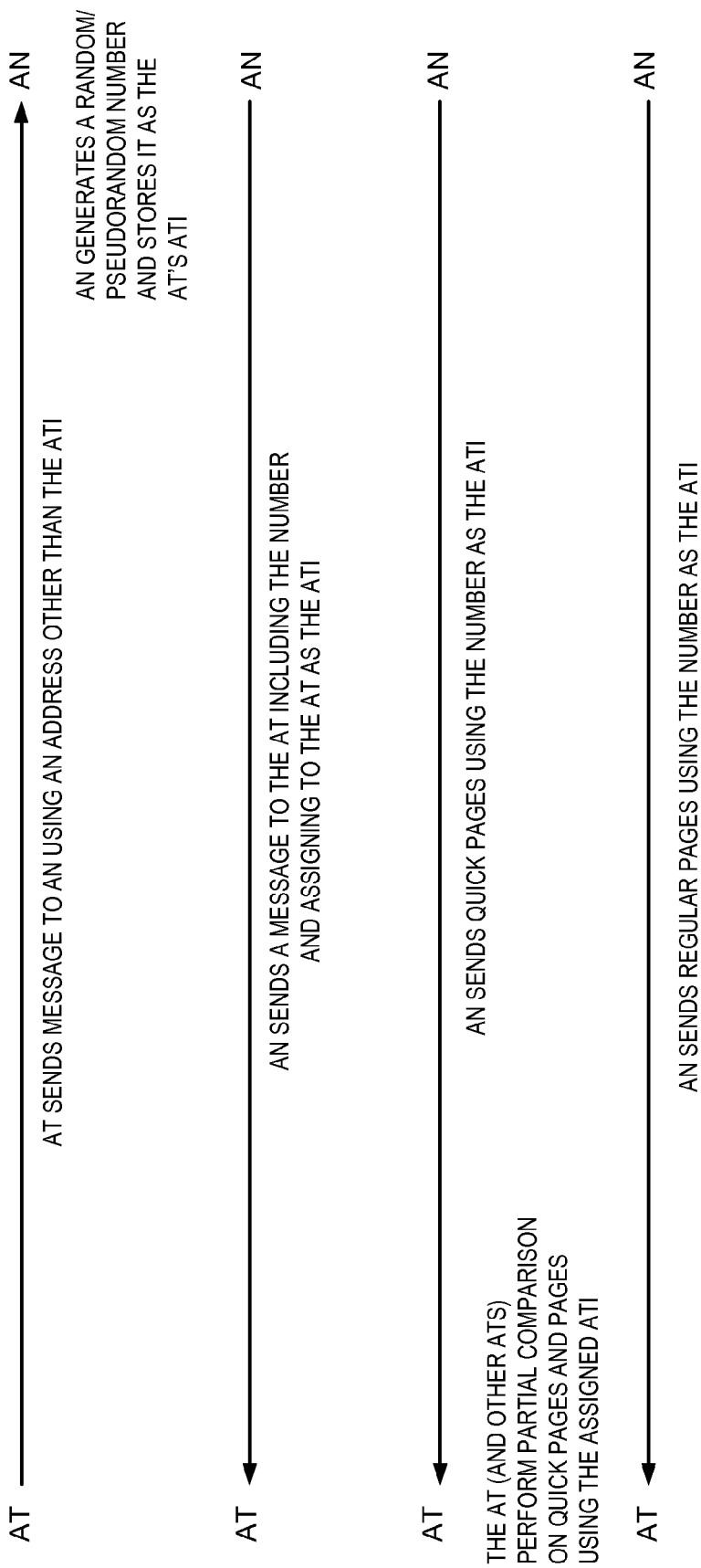
FIG. 7 illustrates another representation for random/pseudorandom ATI assignment pursuant to another embodiment of the present invention.

FIG. 7 shows a method for random/pseudorandom ATI assignment where the random/pseudorandom number is generated in the AN. First the AT sends the AN a message using an address other than the ATI. The AN then generates a random or pseudorandom number and stores it as the AT's ATI. The AN will check to see if the random or pseudorandom number is already assigned as another AT's ATI and if so, will repeat the generation of the random or pseudorandom number until a unique ATI has been determined. The AN then sends a message to the AT including the number and assigning it to the AT as the ATI. Upon receiving the message, the AT will store the pseudorandom number as the ATI. The AN will then perform quick paging and paging to that AT using the ATI. The AT will then use the ATI for paging and quick paging partial comparison techniques.

Alternately, steps of FIG. 6 and of FIG. 7 are combined. For example, suppose that the AT generates the random/pseudorandom number and sends it to the AN and the AN determines that it is already in use; the AN could then generate a unique random or pseudorandom number as described with respect to FIG. 7 and send it in a signaling message to the AT, overriding the number sent by the AT.

According to a further embodiment of the present invention, an enhanced mobile terminal connection setup procedure is provided for selectively enabling or disabling the enhanced mobile terminated connection setup procedure according to the paging load. If the paging load is low, the enhanced mobile terminated connection setup procedure is used. If the paging load is high, the enhanced mobile terminated connection setup procedure is not used. Over-the-air signaling from the AN to the AT tells the AT whether or not to used the enhanced mobile terminated connection setup procedure. If the over-the-air signaling indicates that the enhanced mobile terminated connection setup procedure is not used, traditional procedures such as in the aforementioned contribution C21-20060911-031 are used and the AT will generate a random access sequence for its access attempt in response to a page. If the over-the-air signaling indicates that the enhanced mobile terminated connection setup is used, the AT will take the access sequence from the page message and use it for its access attempt.

The following exemplary messages illustrated in FIGS. 8-10 include a header including the following fields: Length, Message ID, Number of Pages, and Access Sequence ID Included. For the purpose of illustration, it will be assumed that the remaining fields of the message are 256 bits in length total. It will also be assumed that the Page ATI is a 32-bit number and that the Access Sequence ID is a 6-bit number.

It should be noted that message lengths other than 256 bits are also possible. The AN could potentially use larger or smaller messages depending upon the loading of the channel on which the page message is to be sent; if there is more capacity available, more bits could be used; if there is less capacity available, fewer bits could be used.

FIG. 8 shows an example of a page message where the enhanced mobile terminated connection setup procedure is used. The number of pages being sent by the AN is six. The Length field is set to the overall length of the message. The Message ID field is set to a value to indicate that the message is a page message. The number of Pages field is set to six. The Access Sequence ID Included field is set to '1' to indicate that there is an access sequence ID included for each page. Paging ATIs 1, 2, 3, 4, 5, and 6 and Access Sequence IDs 1, 2, 3, 4, 5, and 6, respectively are included. The message also includes spare bits. Since the paging ATIs and the Access sequence IDs can all fit in the message, this message format can be used. There is one Access Sequence ID for each AT being paged. Upon receiving this page message including its ATI, an AT will access using the Access Sequence ID associated with its Paging ATI in the page message. It should be noted that the group of Access Sequence IDs used in paging messages is different from the group that an AT would use for mobile-originated messages or for responding to pages that do not include an Access Sequence ID.

FIG. 9 shows an example of a page message where the enhanced mobile terminated connection setup procedure is not used. The number of pages being sent by the AN is seven. The Length field is set to the overall length of the message. The Message ID field is set to a value to indicate that the message is a page message. The number of Pages field is set to seven. The Access Sequence ID Included field is set to '0' to indicate that there is not an access sequence ID included for each page. Paging ATIs 1, 2, 3, 4, 5, 6, and 7 are included. The message also includes spare bits. Since the paging ATIs and the Access Sequence IDs for all 7 ATs cannot fit in the message, the Access Sequence IDs are omitted from the message. The Paging ATIs all fit in the message, however, so they are all included. Upon receiving this page message including its ATI, an AT will access using a random Access Sequence ID. When the AT responds to this page, it uses an Access Sequence ID randomly chosen from a group other than the group of Access Sequence IDs that are sent in paging messages (at different paging loads).

FIG. 10 shows an example of another page message where the enhanced mobile terminated connection setup procedure is not used. The number of pages being sent by the AN is eleven. The Length field is set to the overall length of the message. The Message ID field is set to a value to indicate that the message is a page message. The number of Pages field is set to eleven. The Access Sequence ID Included field is set to '0' to indicate that there is not an access sequence ID included for each page. Partial identities of equal length associated with ATIs 1, 2, 3, 4, 5, 6, 7, 8, 9, 10, and 11 are included. The message also includes spare bits which are allocated as extra partial identity bits for some of the ATs being paged. Since the paging ATIs and the Access Sequence IDs for all 11 ATs cannot fit in the message, the Access Sequence IDs are omitted from the message. The Paging ATIs also do not fit in the message, so partial identities are included. Upon receiving this page message including the corresponding portion of its identity, an AT will access using a random Access Sequence ID. When the AT responds to this page, it uses an Access Sequence ID randomly chosen from a group other than the group of Access Sequence IDs that are sent in paging messages (at different paging loads).

It should be noted that other variations of message structure are possible. For example, in FIG. 8, the Access Sequence IDs could all be first in the message followed by all Paging ATIs. Another variation of FIG. 8, FIG. 9, and FIG. 10 would omit the Access Sequence ID Included field and the AT would determine whether the Access Sequence IDs are included based upon the value of the Length field and the value of the Number of Pages field.

It should also be noted that there is an interaction with the idea of immediately performing a page match if a partial address comparison using a QPCH message yields a match when the number of pages is sufficiently small. In such a case the Access Sequence ID would not be known to the AT and the AT would, when responding to a page, use an Access Sequence ID randomly chosen from a group other than the group of Access Sequence IDs that are sent in paging messages.

Presently preferred embodiments of the invention and many of its improvements and advantages have been described with a degree of particularity. The description is of preferred examples of implementing the invention, and the description of preferred examples is not necessarily intended to limit the scope of the invention. The scope of the invention is defined by the following claims.

What is claimed:

1. A method in a communications network fix access-terminal paging, said method comprising:
    forming a paging message that comprises an access sequence included field and a plurality of pages;
    determining whether the paging message will include an access sequence that a paged access terminal must use in a connection setup procedure responsive to the paging message;
    populating the paging message with the plurality of pages;
    populating the paging message with the access sequence upon determining that the paging message will include the access sequence;

populating the access sequence included field with a value to indicate whether the paging message includes the access sequence; and transmitting the paging message.

2. The method of claim 1 wherein the access sequence included field comprises a single-bit field.

3. The method of claim 1 wherein the value populating the access sequence included field comprises a logical "one" value to indicate that the paging message includes the access sequence.

4. The method of claim 1 wherein said determining whether to include the access sequence in the paging message is based on at least one of paging load level and paging message length.

5. The method of claim 1 wherein the paging message includes the access sequence and the access sequence is of a bit length of at least four bits.

6. An apparatus for access-terminal paging in a communications network, said apparatus comprising:

an access sequence included field former configured to form an access sequence included field in a paging message, the paging message including a plurality of pages;

a selector configured to select whether the paging message will include an access sequence that a paged access terminal must use in a connection setup procedure responsive to the paging message;

a page message populator configured to:

populate the paging message with the plurality of pages and, and populate the paging message with the access sequence upon selection by the selector that the paging message including an access code; and an access sequence included field populator configured to populate the access sequence included field with a value to indicate whether the paging message includes the access sequence.

7. The apparatus of claim 6 wherein the access sequence included field comprises a single-bit field.

8. The apparatus of claim 6 wherein the value populating the access sequence included field comprises a logical "one" value.

9. The apparatus of claim 6 wherein the selector is configured to select whether to include the access sequence in the paging message based on at least one of paging load level and paging message length.

10. A method in an access terminal, said method comprising:

detecting reception of a paging message at the access terminal from a communications network, wherein the paging message includes a plurality of pages and an access sequence included field indicating whether the paging message includes an access sequence that a paged access terminal must use in a connection setup procedure responsive to the paging message;

determining whether the paging message includes the access sequence based upon the access sequence included field; and upon determining that the paging message includes the access sequence, utilizing the access sequence in the connection setup procedure of the communications network.

11. An apparatus for facilitating access terminal paging of an access terminal, said apparatus comprising:

a detector configured to detect reception of a paging message at the access terminal from a communications network, wherein the paging message includes a plurality of pages and an access sequence included field indicating whether the paging message includes an access sequence that a paged access terminal must use in a connection setup procedure responsive to the paging message;

the detector configured to determine whether the paging message includes the access sequence based upon the access sequence included field; and a chooser configured, if the paging message includes the access sequence, to choose an access sequence number based on the access sequence, wherein the access sequence number is utilized in the connection setup procedure of the communications network.

12. The method of claim 1, wherein an access sequence number is included for each page of the plurality of pages.

13. A method in a communications network for access-terminal paging, said method comprising:

forming a paging message that comprises an access sequence included field and a plurality of pages;

populating the paging message with a plurality of pages;

populating the access sequence included field with a value that indicates inclusion of no access sequence when the plurality of pages comprises partial identities; and transmitting the paging message.

* * * * *